D.C. AMPLIFIER WITH FIXED OUTPUT POLARITY
Filed April 23, 1958
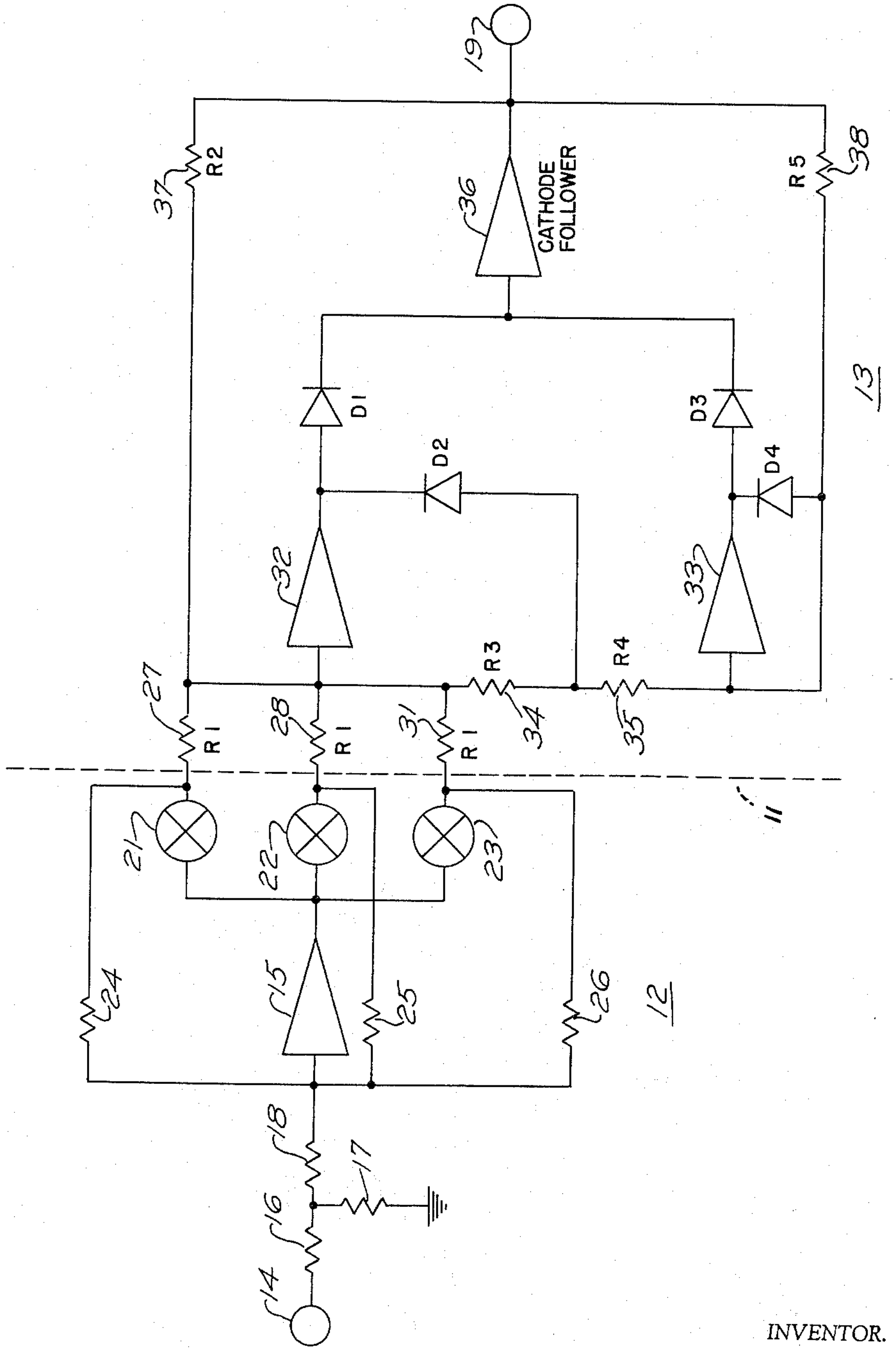
INVENTOR.
FRINK M. YOUNG
BY
Joseph Weingarten
ATTORNEY United States Patent Office 2,997,660
Patented Aug. 22, 1961

2,997,660

D.C. AMPLIFIER WITH FIXED OUTPUT POLARITY

Frink Mansfield Young, Boston, Mass., assignor to Epsco, Incorporated, Boston, Mass., a corporation of Massachusetts Filed Apr. 23, 1958, Ser. No. 730,422
6 Claims. (Cl. 330—151)

The present invention relates in general to amplifiers and more particularly concerns an amplifier having a fixed output polarity independent of uncertain undetermined random variations in the polarity of the input signal. Such amplifiers are especially useful in a system for translating analog and digital data signals from one form to the other. Apparatus arranged according to the invention accepts input signals of either polarity and yields an output signal always of one predetermined polarity with a magnitude which is linearly related to the amplitude of the input. Such an amplifier will be herein referred to as an absolute value amplifier since the output signal is of fixed polarity and related only to the value or amplitude of the input signal. By utilizing operational amplifier techniques, the resultant gain is dependent only upon the value of prescribed precision resistors, despite variations in other circuit parameters.

The advantages of the novel absolute value amplifier will be better understood by reviewing the principles of operation of a representative analog-to-digital converter; typically one operating by successive approximations. Basically, the conversion of an unknown voltage into digital form is effected by means of a series of successive approximations of a current equivalent of the unknown voltage. There are as many reference currents used in the series of approximations as there are binary bits in the digital number to be determined. The currents are weighted according to the form of the binary notation used. When added together, they equal the current equivalent of a full scale voltage input.

The conversion is accomplished a bit at a time. Each bit of the digital number is determined in sequence, beginning with the one of greatest significance. A register is utilized to store the digital number indicative of the input analog voltage. This register is initially set so that only the current associated with the most significant bit is nonzero. A decoded analog voltage is derived corresponding to this current and compared with the input analog voltage. If the input analog voltage is larger than the decoded analog voltage, the first bit remains unchanged and the decoded analog voltage characteristic thereof continues. If the decoded analog voltage is larger, the first bit current value and the characterizing decoded analog voltage are returned to zero. The current value associated with the second most significant bit is then made non-zero and a characterizing decoded analog signal derived therefrom. This voltage is added to the first bit characterizing analog voltage, if any, and the sum compared with the input analog voltage. If the input analog voltage is larger than this sum, the second bit current and the characterizing decoded analog voltage remain unchanged. If the sum is larger, the second bit current and its characterizing decoded analog voltage are returned to zero. In the same manner, the remaining bits of the digital number characteristic of the input analog signal are determined. This type of converter operates on an input analog voltage of one polarity only. Yet, most analog voltages are bipolar and it is desired frequently to have not only the digital equivalent of the input analog voltage, but also, an indication of its polarity.

Accordingly, the present invention contemplates and has as a primary object the provision of an input amplifier for providing an output signal always of the same polarity, yet having a magnitude directly proportional to the magnitude of the input analog signal, regardless of its polarity.

Another object of the invention is to provide an absolute value amplifier in accordance with the preceding object, yielding at the same time an indication of the polarity of the input signal.

Still another object of the invention is the provision of an absolute value amplifier in accordance with the preceding objects capable of responding to relatively rapid changes in the amplitude and/or polarity of the input signal.

A further object of the invention is to provide an absolute value amplifier utilizing a relatively small number of standard components in association with a minimum number of gain-controlling precision components to provide stable operation wherein the gain is insensitive to variations in other parameters.

A still further object of the invention is to provide an input amplifier for use with analog-to-digital conversion apparatus having different ranges so that the dynamic swing of the output signal is as large as possible, regardless of the input voltage swing, thereby enabling the associated conversion equipment to more accurately encode the input analog voltage.

According to the invention, an input analog signal consisting of both positive and negative variations is coupled to the input of a first operational amplifier. Means are provided for rendering a second operational amplifier responsive to the output of the first amplifier only when the first amplifier output is, let us assume, negative. Means responsive to the output polarity of the first and second amplifiers selectively couple only one of the amplifier outputs to an output terminal. Thus, when the input signal is of one polarity, it is coupled to the output terminal by one inverting amplifier. When it is of opposite polarity, it is coupled to the output terminal by two inverting amplifiers, thereby retaining its original polarity. However, regardless of the number of amplifiers coupling the input signal to the output terminal, input and feedback impedances are selected to control the overall gain so that both the polarity and magnitude of the output signal are independent of the input signal polarity.

In a preferred form of the invention, a gain change operational amplifier provides the input signal to the absolute value amplifier. Gain changes are effected by selectively connecting different feed back resistances across the gain change amplifier and a corresponding input impedance to the absolute value amplifier.

Other features, objects and advantages of the invention will become apparent from the following specification when read in connection with the accompanying drawing, the single figure of which shows a block-schematic circuit diagram of a preferred embodiment of the invention.

With reference to the drawing, a broken line 11 separates the gain change operational amplifier 12 from the absolute value operational amplifier 13. An input analog signal is applied to terminal 14 to provide an output signal on output terminal 19 having a magnitude proportional to the input signal magnitude, but always of a constant polarity. In the following discussion the desired constant output signal will be assumed to have a positive polarity. Of course a constant negative polarity output could be arranged with equal facility.

A detailed description of the system arrangement will facilitate understanding its mode of operation. Terminal 14 is connected to the input of high gain amplifier 15 through a precision attenuator formed of resistors 16 and 17 and input resistance 18. Switches 21, 22, and 23 respectively select one of feedback resistances 24, 25 and 26, respectively, and connect a respective one of the input resistances 27, 28 and 31 to absolute value amplifier 13. The selected input resistance is connected to the input of a first high gain amplifier 32. The input of amplifier 32 is also coupled to the input of high gain amplifier 33 through serially-connected resistances 34 and 35. Diode D2 is connected between the output of amplifier 32 and the junction of resistors 34 and 35. Diode D1 couples the output of amplifier 32 to the input of cathode follower 36. Diode D3 couples the output of amplifier 33 to the input of cathode follower 36. Diode D4 couples the output of amplifier 33 to its input. The output of cathode follower 36 is connected to output terminal 19 and to the inputs of amplifiers 32 and 33 by feedback resistances 37 and 38, respectively.

Having described the physical arrangement of the system, its mode of operation will be discussed, first considering briefly the operational amplifiers used in the preferred embodiment. The term "operational amplifier" as used herein means a high gain phase inverting amplifier whose output voltage can swing both positive and negative relative to ground and in which the input signal is fed through an input resistance to the amplifier's input and the output signal is fed back to the amplifier's input through a feedback resistance. Because the amplifier's gain is large and phase inverting, the amplifier's input remains virtually at ground potential since the superimposed effects of input and feedback signals cancel each other at the amplifier input point. The amplifier input point is known as a virtual ground since it behaves as if it were held at ground potential.

Considering now the overall system operation, an input signal is attenuated by the network formed of resistors 16 and 17 and provided at the output of amplifier 15 having a gain equal to the product of the attenuation introduced by resistors 16 and 17 with the ratio of the selected feedback resistance 24, 25 or 26 to the input resistance 18. The closed one of switches 21, 22 and 23 connects the selected feedback resistance across amplifier 15 and the output of amplifier 15 to one of input resistances 27, 28 and 31, respectively, of absolute value amplifier 13.

Initially, it is convenient to assume that the signal applied to the input of the first amplifier 32 is then negative, and diodes D1 and D2 are respectively conductive and non-conductive. The positive signal at the output of amplifier 32 is coupled through conducting diode D1 and cathode follower 36 to output terminal 19.

The positive potential on terminal 19 is coupled back through feedback resistor 37 to the input of amplifier 32 and maintains the amplifier's input point at virtually ground. The positive potential on terminal 19 is also fed back through resistor 38 to render the input of amplifier 33 and, in effect renders the input to amplifier 33 positive with respect to the input of amplifier 32. The positive input to amplifier 33 causes its output to be negative and D4 is made conductive because it is forwardly biased by the positive feedback from resistor 38 and the negative output of amplifier 33. The effective input resistance to amplifier 33 with diode D2 non-conductive is the serial combination of resistors 34 and 35. Since diode D4 is conductive the gain of amplifier 33 is the ratio of the forward resistance of diode D4 to the serial combination of resistors 34 and 35, or essentially zero. The output of amplifier 33 is slightly negative because of the positive potential coupled from terminal 19 by feedback resistance 38 being inverted in polarity by amplifier 33. As a result, diode D3 is not conducting. Under these conditions the absolute value amplifier 13 is functioning as an operational amplifier with a single high gain amplifier 32, the overall gain being the ratio of feedback resistance 37 to the selected input resistance 27 or 28 or 31.

Now consider the situation when the input signal coupled through the selected input resistance is positive. The output of amplifier 32 is then negative, thereby rendering diodes D1 and D2 respectively non-conductive and conductive. Amplifier 32 is now an operational amplifier in which resistor 34 is the feedback resistance and the negative ratio of this resistance to the selected input resistance is the gain thereof. At the same time, the output of amplifier 32 is coupled to the input of amplifier 33 through input resistor 35. Since this signal is now negative, the output of amplifier 33 becomes positive and diodes D4 and D3 become respectively non-conductive and conductive. The positive output of amplifier 33 is therefore coupled through cathode follower 36 to output terminal 19. Feedback resistance 38 is now active in determining the gain of the operational amplifier including amplifier 33 and input resistance 35, the gain being the negative ratio of resistance 38 to resistance 35. At the same time, positive feedback is being applied to the input of amplifier 32 through resistor 37.

The effect of this positive feedback will be better understood from the following analysis. In a feedback system, the closed-loop gain, $K_{CL}$ is given by the equation $$K_{CL}=\frac{K_{OL}}{1-BK_{OL}}$$

where $K_{OL}$ is the open loop gain and B is the gain of the feedback loop.

In absolute value amplifier 13, the open loop gain is the product of the gains of the cascaded operational amplifiers, $$\frac{R_3R_5}{R_1R_4}$$

The effective feedback loop gain B is the ratio $R_1/R_2$. This is because currents will flow in the respective resistors until the voltages thereacross are substantially equal, thereby resulting in zero voltage at the input of amplifier 32. Therefore, $$K_{CL}=\frac{\frac{R_3R_5}{R_1R_4}}{1-\frac{R_1R_3R_5}{R_2R_1R_4}}$$

$$=\frac{R_2R_3R_5}{R_1(R_2R_4-R_3R_5)}$$

This is the gain in response to a positive input signal. It will be recalled that the gain in response to a negative input signal was $R_2/R_1$. To obtain the same gain in response to signals of either polarity, the two gains are made equal.

$$\frac{R_2}{R_1}=\frac{R_2R_3R_5}{R_1(R_2R_4-R_3R_5)}$$

$$R_2R_4-R_3R_5=R_3R_5$$

$$R_2R_4=2R_3R_5$$

$$R_2=2R_3\frac{R_5}{R_4}$$

It is to be noted that the ratio $R_5/R_4$ is the gain of the second operational amplifier when responsive to the output of the first. Therefore, if this gain is made unity, $R_2=2R_3$. This is an especially convenient arrangement because a pair of inexpensive low-tolerance matched resistors can be chosen for resistors 37 and 34 by comparison bridge measurement without requiring the use of high precision resistors.

In a representative embodiment of the invention, amplifiers 15, 32 and 33 are chopper stabilized D.-C. amplifiers and the following resistance values yield an output signal having a magnitude and polarity independent of the input signal polarity with selectable dynamic ranges of 10, 100 and 1000 volts, respectively:

| | Megohms |
|---|---|
| Resistor 14 | 0.909091 |
| Resistor 17 | 1 |
| Resistor 18 | 0.1 |
| Resistor 24 | 0.05 |
| Resistor 25 | 0.5 |
| Resistor 26 | 1 |
| Resistors 27 and 28 | 0.5 |
| Resistor 31 | 0.1 |
| Resistor 34 | 0.275 |
| Resistor 37 | 0.55 |
| Resistors 35 and 38 | 0.1 |

For different applications, different resistance values may be selected. It is apparent that numerous other modifications of and departures from the specific embodiment described herein may be practiced by those skilled in the art without departing from the inventive concepts. Consequently, the invention is to be construed as limited only by the spirit and scope of the appended claims.

What is claimed is:

1. An absolute value operational amplifier for providing an output signal of constant polarity and having a magnitude proportional to the magnitude of the input signal which may be of either polarity comprising, an input terminal, first and second amplifiers, means coupling said input terminal to the inputs of said first and second amplifiers, a first unilaterally conducting device for coupling the output of said first amplifier to the input of said second amplifier, an output terminal, second and third unilaterally conducting devices for coupling the outputs of said first and second amplifiers respectively to said output terminal, and a fourth unilaterally conducting device for coupling the output of said second amplifier to its input, said first and second devices being oppositely poled with respect to the output of said first amplifier, said third and fourth devices being oppositely poled with respect to the output of said second amplifier, and second and third devices being similarly poled with respect to said output terminal.

2. An absolute value operational amplifier for providing an output signal of constant polarity and having a magnitude proportional to the magnitude of the input signal which may be of either polarity comprising, an input terminal, first and second amplifiers, an input impedance coupling said input terminal to the inputs of said first and second amplifiers, means for coupling said input terminal to the input of said second amplifier, a first unilaterally conducting device for coupling the output of said first amplifier to the input of said second amplifier, an output terminal, second and third unilaterally conducting devices for coupling the outputs of said first and second amplifiers respectively to said output terminal, a fourth unilaterally conducting device for coupling the output of said second amplifier to its input, said first and second devices being oppositely poled with respect to the output of said first amplifier, said third and fourth devices being oppositely poled with respect to the output of said second amplifier, and said second and third devices being similarly poled with respect to said output terminal.

3. An absolute value operational amplifier for providing an output signal having a polarity which remains the same regardless of the input signal polarity comprising, an input terminal, first and second amplifiers, an input resistance connected between said input terminal and the input of said first amplifier, second and third resistances serially-connected between the inputs of said first and second amplifiers, a first diode connected between the output of said first amplifier and the junction of said second and third resistances, a cathode follower, second and third diodes respectively connected from the outputs of said first and second amplifiers to the input of said cathode follower, a fourth diode connected between the output and input of said second amplifier, and first and second feedback resistances connected from the output of said cathode follower to said first and second amplifier inputs, respectively.

4. An absolute value operational amplifier in accordance with claim 3 and further comprising, a gain change amplifier comprising, a gain change operational amplifier, a plurality of gain change feedback resistances, additional input resistances selectively connectible between said input terminal and said first amplifier input, and means for selectively connecting one of said feedback resistances between the input and output of said gain change amplifier and a corresponding selected one of said input resistances between the latter output and said first amplifier input.

5. Apparatus in accordance with claim 3 wherein said resistances are related by the equation $$R_2R_4=2R_3R_5$$

wherein $R_2$ and $R_5$ are said first and second feedback resistances, respectively, and $R_3$ and $R_4$ are said second and third resistances, respectively.

6. Apparatus in accordance with claim 5 wherein the ratio $R_5/R_4$ is substantially one.

References Cited in the file of this patent

UNITED STATES PATENTS

| | | |
|---|---|---|
| 2,719,191 | Hermes | Sept. 27, 1955 |
| 2,873,312 | Moe | Feb. 10, 1959 |

FOREIGN PATENTS

| | | |
|---|---|---|
| 237,096 | Switzerland | Aug. 1, 1945 |
| 129,404 | Australia | Apr. 29, 1948 |